United States Patent [19]

Miller

[11] 4,032,267

[45] June 28, 1977

[54] GEROTOR MOTOR WITH A STATIONARY INNER MEMBER AND A ROTATING AND ORBITING OUTER MEMBER

[75] Inventor: Laurence Lockhart Miller, West Lafayette, Ind.

[73] Assignee: TRW Inc., Cleveland, Ohio

[22] Filed: Nov. 17, 1975

[21] Appl. No.: 632,520

[52] U.S. Cl. .............................. 418/61 B; 418/161; 64/9 R

[51] Int. Cl.$^2$ .................... F01C 1/02; F01C 17/02; F03C 3/00; F16D 3/18

[58] Field of Search ............ 418/61 B, 161; 60/384; 180/66 F; 64/9 R

[56] References Cited

UNITED STATES PATENTS

| | | | |
|---|---|---|---|
| 2,841,966 | 7/1958 | Belden et al. | 64/9 R |
| 2,989,951 | 6/1961 | Charlson | 418/61 B |
| 3,574,489 | 4/1971 | Pierrat | 418/61 B |
| 3,782,866 | 1/1974 | McDermott | 418/61 B |
| 3,895,888 | 7/1975 | Roberts | 418/61 B |
| R26,383 | 4/1968 | Huber | 418/61 B |

FOREIGN PATENTS OR APPLICATIONS

| | | | |
|---|---|---|---|
| 1,811,386 | 6/1970 | Germany | 418/61 B |

*Primary Examiner*—John J. Vrablik

[57] ABSTRACT

A hydraulic motor includes an elongated output member which is supported for rotational movement about a central axis thereof. The output member is driven by a gerotor gearset which includes an outer member having internal teeth which mesh with external teeth on an inner member. The inner member is fixed against movement and the teeth on the inner and outer members define a series of expansible and contractable fluid pockets. The outer member orbits and rotates as a result of fluid being directed into certain of the fluid pockets to expand same and fluid is directed from contracting pockets. A tubular member drivingly connects the outer member and output member and transmits driving torque to the output member. The tubular member is connected in a 1:1 rotational driving relationship with the outer member and output member. The driving connection of the tubular member to the outer member and output member is such that the tubular member can rock relative to these members so that its motion describes a cone as it follows the orbital motion of the outer member and transmits rotary motion to the output member.

10 Claims, 5 Drawing Figures

GEROTOR MOTOR WITH A STATIONARY INNER MEMBER AND A ROTATING AND ORBITING OUTER MEMBER

BACKGROUND OF THE INVENTION

This invention relates generally to hydraulic devices, and particularly to hydraulic motors which include a gerotor gearset.

Hydraulic motors which include a gerotor gearset are well known. The gearset normally includes an outer internally-toothed member and an inner externally-toothed member. The teeth of the inner and outer toothed members define expansible and contractable fluid pockets therebetween. A commutating valve arrangement is utilized to direct fluid into the fluid pockets to effect expansion of the pockets and to direct fluid from the contracting pockets. The expansion and contraction of the fluid pockets results in relative rotary and orbital movement of the stator and rotor. The rotational movement is relatively slow as opposed to the orbiting movement and in a specific arrangement where an inner element has six teeth and an outer element has even seven teeth, six orbits will occur for a single revolution.

Typically, the inner number (rotor) both orbits and rotates while the outer number (stator) is stationary. The teeth of the stator support and guide the rotor in its orbital and rotational movement. The rotor commonly orbits six times for each revolution and it is connected to an output shaft in a 1:1 relationship with rotation of the rotor. Such hydraulic motors are well known and are commonly referred to as low-speed high-torque motors. A typical example of such is shown in U.S. Pat. No. 3,289,602, and that disclosure is incorporated herein by reference.

One of the particular problems with the aforementioned known hydraulic motors centers around the output drive from the gearset. Commonly, a spline connection is provided between the output shaft and the rotor. The diameter of this drive shaft and spline connection is limited, of course, by the particular size of the rotor, and in the event that higher pressures or torques are desired to be produced by a gearset of a given size, breakage or damage to the drive shaft or spline can, and has occurred. To increase the diameter of the shaft without increasing the gearset size would entail increasing the size of the rotor bore in which the shaft is received, which would greatly weaken the rotor, and thereby increase the possibilities of rotor breakage.

Accordingly, the output drive from the rotor in hydraulic motors of the type to which the present invention is directed is a weak link in the torque-transmitting system. In order to obtain higher torques from such hydraulic motors, the diameters of the output shaft, as well as the diameter of the gerotor gearset, could be increased and, of course, such would increase the size of the housing for the motor and thus result in an overall larger motor size.

SUMMARY OF THE PRESENT INVENTION

The present invention relates to a hydraulic motor of the above-mentioned type which eliminates the aforementioned problem centered around the output drive, and provides for high output torques without a significant increase in the overall size of the motor. Specifically, the motor constructed in accordance with the present invention having a given size gearset can produce significantly greater output torques without a significant package size increase, as compared to known motors of the type to which the present invention is directed with the same size gearset. The present invention achieves this significant advantage by eliminating the common output drive shaft which extends into the bore of the rotor and is drivingly connected to the rotor, as has been commonly provided in the art.

In accordance with the present invention, an internally-toothed outer member is supported and guided for orbital and rotational movement by an externally-toothed inner member which is fixed against movement. A tubular member is drivingly connected at one end to the outer internally-toothed outer member and at its other end to an output member. The tubular member, because of its relatively large diameter, is capable of carrying significant torque levels, and, of course, eliminates the afore-mentioned problems due to the central shaft being splined to the externally-toothed inner member, as in the art.

In accordance with the present invention, the internally-toothed outer member is provided with a spline connection on the outer periphery thereof for driving connection to the tubular member. The outer member both orbits and rotates as fluid flows into and out of the expanding and contracting pockets defined by the teeth of the inner and outer members. Upon orbital and rotational movement of the outer member, one end of the tubular member will rotate and orbit with the outer member, but only its rotary movement will be transmitted to the output member of the hydraulic motor. The tubular member can rock with respect to both the and the output member and its motion defines a cone as it follows the orbital and rotational movement of the outer member and transmits rotational movement to the output member and the outer member.

As a result of the present construction, substantial torque levels can be transmitted without increasing the size of the gearset. Further, these high torque levels can be transmitted through the tubular member without any significant increase in the size of the motor housing. Accordingly, the present invention does provide a hydraulic motor where a greater output torque can be achieved with an insignificant increase in package size as compated with the teachings of the prior art with the same size gearset.

While applicant recognizes that the transmission of torque through a tubular member is not a new concept, and U.S. Pat. No. 3,574,489 is one example of the use of a tubular member for transmitting torque to an output member, it is believed clear that the use of a tubular output member which rotates and orbits with the outer member of gerotor gearset and which rocks relative to the output member provides a substantial improvement in the hydraulic motor art, as set forth above, and is not known or obvious from the art.

In accordance with the present disclosure, the connections between the tubular member, the outer member and the output member are particularly designed so that the portion of the tubular member, which is connected to the outer member for rotation in a 1:1 relationship therewith, can perform rotational and orbital motion therewith, while at the same time the tubular member rotationally drives the output member in a 1:1 relationship. The respective connections between the tubular member and the output member comprise coniflex spline connections, which permit the aforementioned predetermined amount of rocking movement of the tubular member with respect to the respective output member and the outer member while maintaining a desirable degree of pressure between the teeth of the respective splines.

DESCRIPTION OF THE DRAWINGS

The other objects and advantages of the present invention will become apparent from the following description of a preferred embodiment made with reference to the accompanying drawing, wherein.

DETAILED DESCRIPTION OF A PREFERRED EMBODIMENT

As stated above, the present invention relates to a hydraulic device which is preferably adapted to function as a hydraulic motor. The description which follows relates specifically to the operation of such a device as a hydraulic motor. From the description which follows, the manner in which the device can function in numerous capacities without departing from the spirit or principles of the present invention, will be readily apparent to those of ordinary skill in the art.

Figure 1:
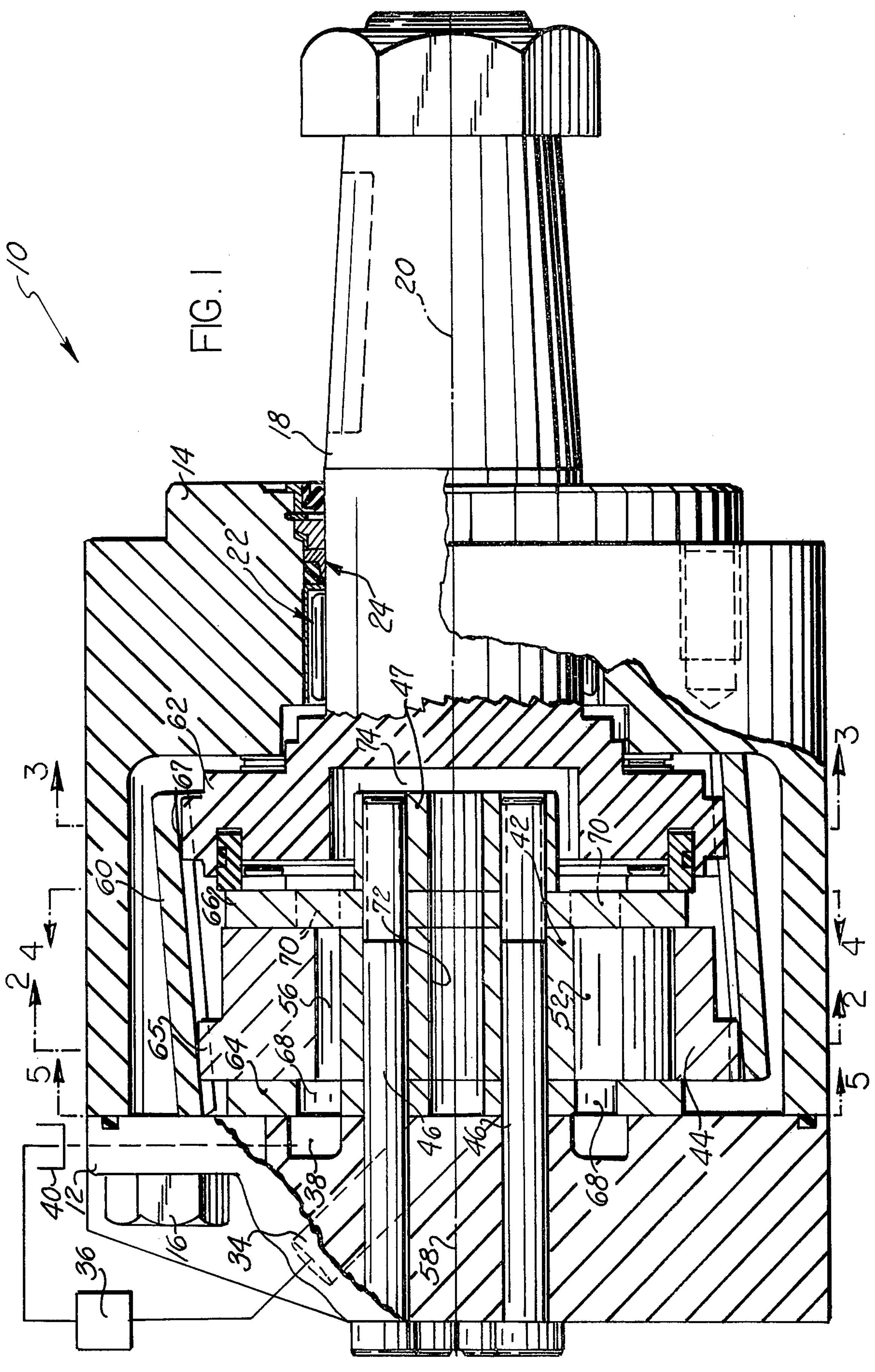
FIG. 1 is a sectional view of a hydraulic device constructed according to the present invention.

The present invention is shown in FIG. 1 as embodied in a hydraulic motor having a casing 10. The casing 10 comprises a pair of housing sections 12, 14 joined together by a plurality of bolts 16. Extending outwardly from housing section 14 is an output shaft 18 which is supported for rotation about its central axis 20. The output shaft 18 may be connected to drive a suitable device. The elements which rotationally support the output shaft in the housing 10 (i.e., roller bearings 22, and seal 24) are conventional and will not be described in any further detail.

Housing section 12 includes an inlet port 34 connected to a source of high pressure fluid (illustrated schematically at 36). A return port 38 directs low pressure fluid from the hydraulic motor to a reservoir 40.

Figure 2:
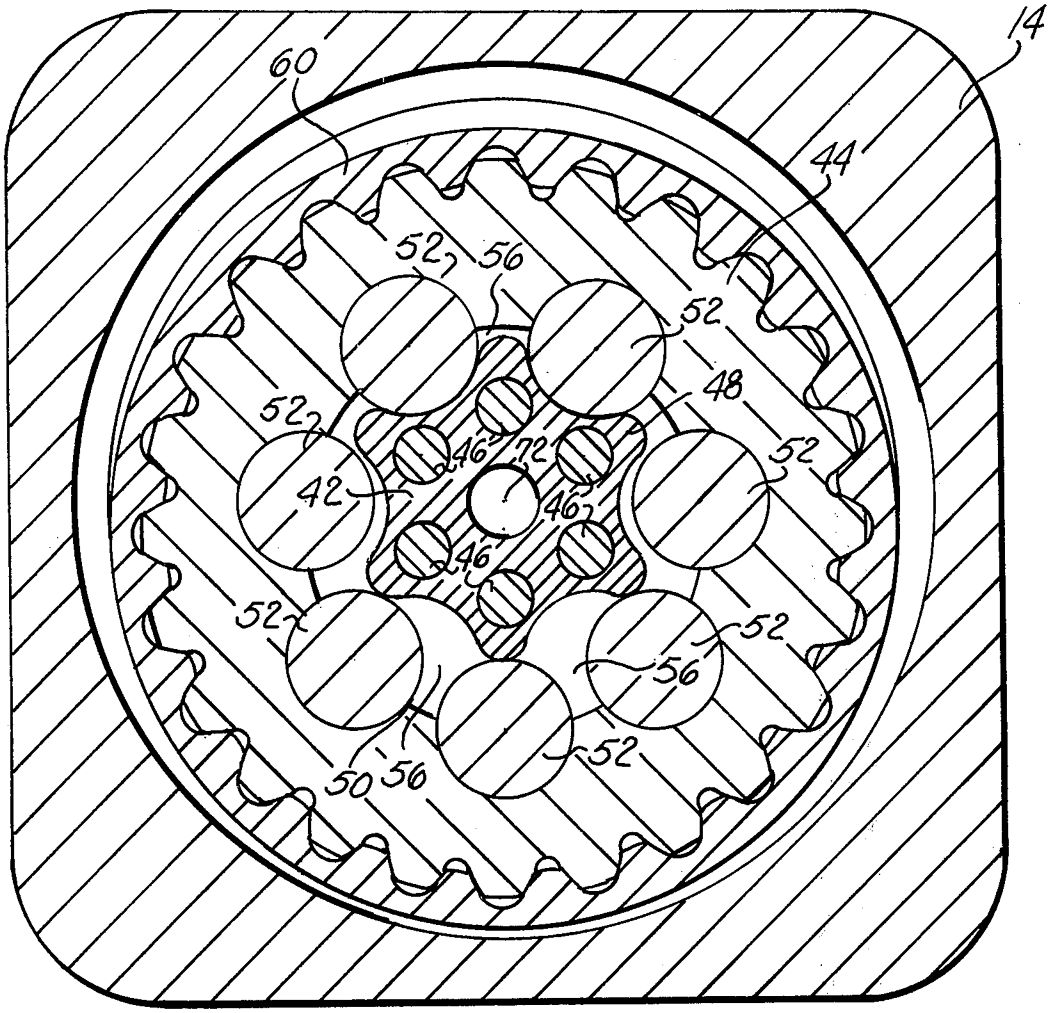
FIGS. 2 through 5 are cross-sectional views of the device shown in FIG. 1, taken, respectively, along the lines 2—2, 3—3, 4—4, 5—5 of FIG. 1.

The motor of the present invention includes a gerotor gearset for rotationally driving the shaft 18 upon fluid being directed from the source 36 into the motor. The gerotor gearset includes an externally-toothed inner member 42 and an internally-toothed outer member 44. The outer member 44 is located in surrounding relation to the inner member 42 and circumferentially adjacent thereto. The outer member 44 includes a plurality of teeth 50, each of which is formed by a roller 52 carried by a respective recess 54 in the outer member. As seen in FIG. 2, the outer member includes one more tooth than the inner member 42.

The motor includes means for preventing any movement of the inner member 42. Specifically, the inner member 42 is fixed to the casing 10 by screws 46 which extend through aligned openings in the casing and inner member and are threaded in tapped openings in a collar 47. As a result, the outer member 44 is free to orbit and rotate relative to the inner member 42, and the outer member is supported for and guided in such movement by the meshing teeth of the inner and outer members.

Spaces 56 between the outer member teeth and inner member teeth form fluid pockets or chambers. High pressure fluid delivered to half of the fluid pockets produces a torque on the gerotor gearset, which torque causes the outer member 44 to rotate and orbit about the central axis 58 of the inner member 42, which axis corresponds with the axis 20. Since axis 58 coincides with central axis 20 of the output shaft, the resulting motion of the outer member is rotational and orbital with respect to the central axis 20 of the output shaft. In the disclosed embodiment, the outer periphery of the inner member 42 has six teeth and the inner periphery of the outer member 44 has seven rollers which form its teeth. This means that for every revolution of the outer member about its axis, the outer member axis will orbit about the central axis 26 times.

Connected to the outer periphery of the 44 is an axially extending tubular member 60 having a uniformly dimensioned internal diameter. As seen in FIG. 1, the inner periphery of the tubular member 60 is connected both to the outer periphery of the outer member 44 and to the outer periphery of the flange 62, which is fixedly connected on the output shaft 18 and extends diametrically thereof. The outer diameter of the flange 62 is greater than the outer diameter of the portion of the shaft 18 supported by bearing 22.

Figure 3:
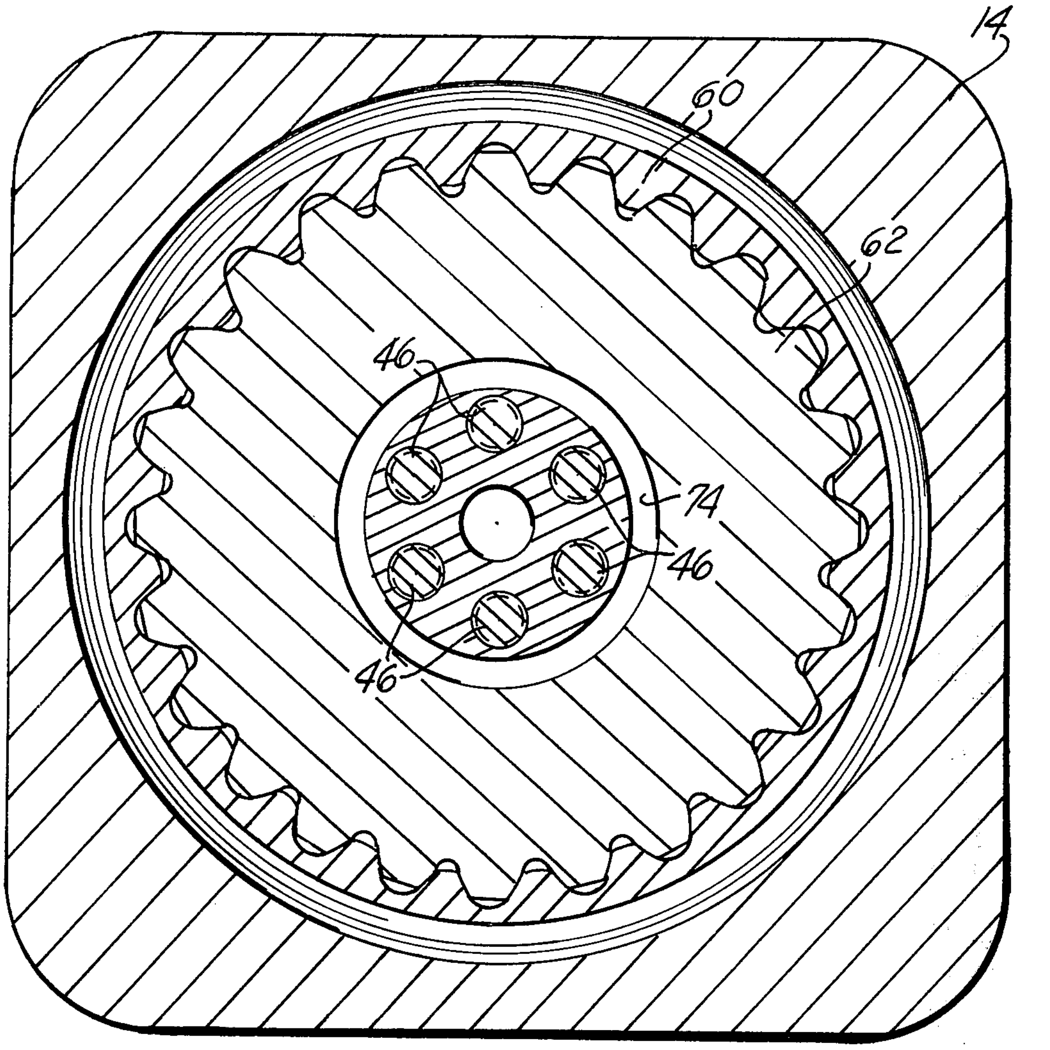
Figure 4:
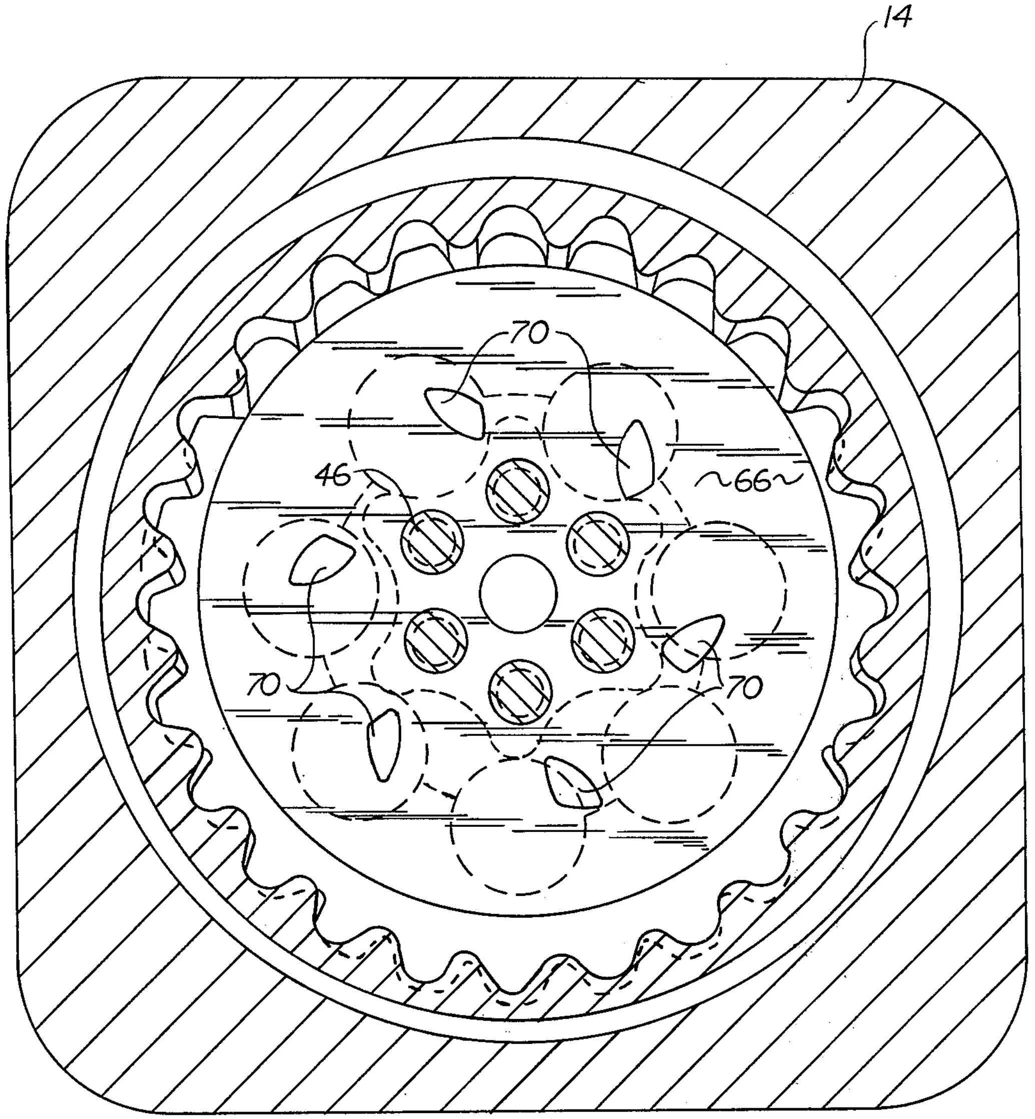

As seen in FIGS. 2 and 3, the tubular member has a splined connection to both the outer member 44 and to the flange 62, and is preferably in a 1:1 rotational driving relationship with each of those members. The splines 65 on the outer member 44 and the splines 67 on the output member are curved in an axial direction. This allows the tubular member to rock with respect to both the output member and the outer member 44. In addition, it is contemplated that the splines on the tubular member could also be curved in an axial direction to further promote such relative rocking motion.

It is further contemplated that the pressure angles between the respective spline connections are such that the teeth on each of the members 44, 62 comprise between 50 and 60 percent of the circular pitch of the spline connections, and the engagement of the teeth of members 44, 62 with the teeth of tubular member 60 are at pressure angles of 45°. This pressure relationship is similar to that shown in U.S. Pat. No. 3,606,601, and assigned to the assignee of the present invention, the disclosure of which is hereby incorporated by reference.

From the above, it should be apparent that the tubular member can rock with respect to both the outer member 44 and the flange 62. The end of the tubular member connected to the outer member follows the outer member in its orbital and rotational motion about the central axis 20, and during such motion a rocking action occurs between the spline connection of the outer member 44 and tubular member 60. The flange 62 is supported for only rotational movement and the tubular member 60 serves to rotationally drive the flange 62 about the central axis 20. During such action, the tubular member 60 rocks relative to flange 62. It should be noted that for illustration purposes the spline teeth have been shown in FIGS. 2–5 in enlarged size in relation to the other parts of the motor.

Figure 5:
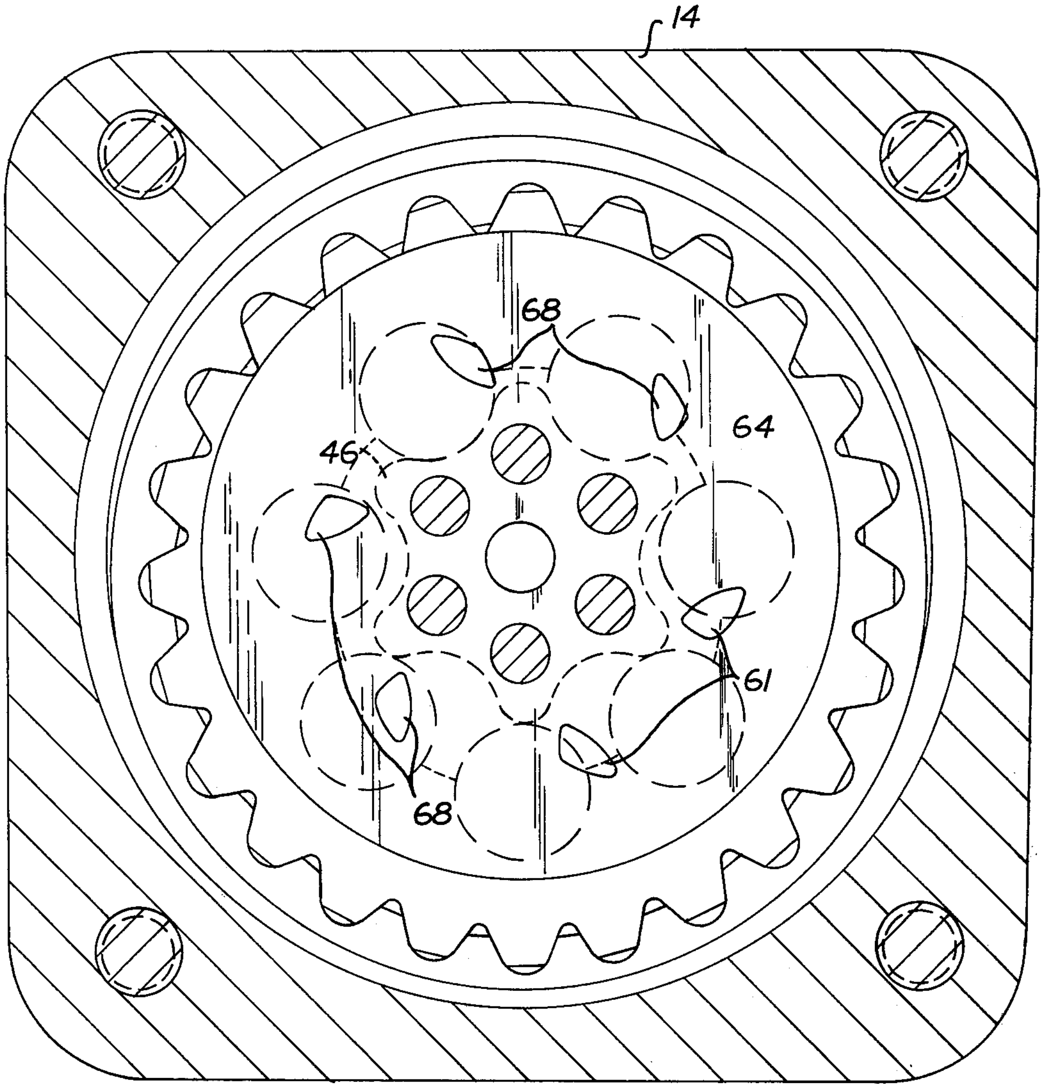

A commutation valve arrangement is provided for directing fluid to and from the fluid pockets 56 for producing the outer member movement. According to the invention, there is provided a manifold plate 64 on one axial side of the gerotor gearset, and a second manifold plate 66 on the opposite axial side of the gerotor gearset. The manifold plate 64, 66 are fixed to the casing by the bolts 46 and are encircled by the tubular member 60. Referring to FIGS. 1 and 5, manifold plate 64 includes a plurality of axially extending fluid passages 68 corresponding in number to the number of teeth on the inner number 42. The fluid passages each communicate with the gerotor gearset and with the return port 38. Orbital and rotational movement of the outer number 44 communicates one-half of the contracting pockets with the fluid passages 68, which in turn direct the low pressure fluid to return port 38 and to the reservoir 40.

Manifold plate 66 includes a plurality of axially extending fluid passages 70, which correspond in number to the number of teeth on the inner number 42. Passing through manifold plates 64, 66 and the inner member 42 is central opening 72 communicating with inlet port 34 and directing fluid to a fluid chamber 74. The fluid passages 70 in the manifold plate 66 communicate with the fluid chamber 74 and direct high pressure into the fluid pockets while the fluid passages 68 in manifold plate 64 direct low pressure fluid to the outlet port 38. The fluid passages in the manifold plates 64 and 66 are very precisely located such that high pressure fluid from the fluid chamber 74 is communicated to one-half of the fluid pockets to thereby expand those pockets, while low pressure fluid from the contracting one-half of the fluid pockets is delivered to return port 38. This produces a torque on the gerotor gearset causing the outer member 44 to orbit and rotate about central axis 20. The orbital and rotational movements of the outer member are transmitted to the tubular member 62. This driving relationship serves to rotationally drive the output shaft 18 in a 1:1 relationship with rotation of outer member 44.

Since the above described motor utilizes the tubular member 60 which transmits rotary motion of the outer member 44 to rotary motion of the output shaft 18, the afore-mentioned problems relating to torque levels achievable with known hydraulic motors have been eliminated. More specifically, the present motor utilizes a gerotor gearset but avoids a connection of the output shaft to the inner member and rather utilizes a relatively large diameter tubular member 60 to transmit output torque. As a result, for a given gearset size, relatively large output torques can be achieved without significant increase in overall motor size.

With the foregoing disclosure in mind, many and varied obvious modifications of the present invention will be readily apparent to those of ordinary skill in the art.

Having described my invention, I claim:

1. A hydraulic motor comprising an elongated output member, bearing means supporting said output member for rotational movement about a central axis, a series of expansible and contractable fluid pockets formed by a gearset having an internally toothed outer member and an externally toothed inner member, said internally toothed outer member having a central axis and having orbital motion with respect to said output member central axis and rotational movement about its central axis and being guided in such movement by the meshing teeth of said inner and outer member, valve means for directing fluid into certain of said pockets to effect expansion thereof and for directing fluid out of contracting pockets to thereby effect rotational and orbital movement of said outer member, a tubular member drivingly coupling said output member to said outer member to effect rotation of said output member upon orbital and rotational movement of said outer member, said tubular member comprising an elongated body having an axial passageway therethrough, one end of said tubular member having a drive connection with said outer member at a plurality of locations circumferentially spaced around the central axis of the outer member, and the other end of said tubular member having a drive connection with said output member at a plurality of locations circumferentially spaced around said central axis of said output member, said drive connection between the outer member and said tubular member enabling orbital and rotational movement of said tubular member to occur with said outer member and rocking movement of said tubular member to occur relative to said outer member, and said drive connection between said output member and said tubular member effecting rotation of said output member upon orbiting and rotational movement of the end of said tubular member connected to said outer member and enabling rocking movement of the tubular member to occur relative to said output member.

2. A hydraulic motor as defined in claim 1 wherein said one end of said tubular member has an inner periphery which is greater than the outer periphery of said outer member and wherein said one end of said tubular member is disposed in surrounding relationship to a portion of the outer periphery of said outer member.

3. A hyraulic motor as defined in claim 2 wherein said tubular member is substantially cylindrically shaped and has an inner periphery having the shape of a gear member of substantial uniform pitch circle diameter, said outer member having an outer periphery in the shape of a gear member in meshing engagement with the gear member of said tubular member.

4. A hydraulic motor as defined in claim 3 wherein said output member includes a gear member in meshing engagement with said gear member of said tubular member, the gear engagement between the tubular member and the outer member and the gear engagement between the tubular member and the output member each being in a 1:1 rotational relationship.

5. A hydraulic motor as defined in claim 3 wherein the gear engagement between the tubular member and the outer member permits rocking of the tubular member relative to the outer member, and wherein the gear engagement of the tubular member and the output member permits rocking movement of the tubular member relative to said output member.

6. A hydraulic motor comprising an elongated output member, bearing means supporting said output member for rotational movement about a central axis, a series of expansible and contractable fluid pockets formed by a gearset having an internally toothed outer member and an externally toothed inner member, said internally toothed outer member having a central axis and having orbital motion with respect to said output member central axis and rotational movement about its central axis and being guided in such movement by the meshing teeth of said inner and outer members, valve means for directing fluid into certain of said pockets to effect expansion thereof and for directing fluid out of contracting pockets to thereby effect rotational and orbital movement of said outer member, a tubular member drivingly coupling said output member to said outer member to effect rotation of said output member upon orbital and rotational movement of said outer member, said tubular member comprising an elongated body having an axial passageway therethrough, one end of said tubular member receiving said outer member and the other end of said tubular member receiving said output member, a drive connection between the outer periphery of said outer member and said tubular member which enables orbital and rotational movement of said tubular member to occur with said outer member and rocking movement of said tubular member to occur relative to said outer member, and a drive connection between said output member and said tubular member for effecting rotation of said output member upon orbiting and rotational movement of the end of said tubular member connected to said outer member and for enabling rocking movement of the tubular member to occur relative to said output member.

7. A hydraulic motor as defined in claim 6 including means for preventing orbital and rotational movement of said inner member and the drive connections between the outer periphery of said tubular member and said outer member and between the other end of the tubular member and the output member being effective to rotationally drive the output member at a 1:1 relationship with rotation of said outer member.

8. A hydraulic motor as set forth in claim 6 wherein the driving connection of said one end of said tubular member to said outer member is a gear connection such that the tubular member is free to rock with respect to the outer periphery of the outer member, and the driving connection of said other end of said tubular member to said output member is a gear connection such that the tubular member is free to rock with respect to the output member.

9. A hydraulic motor as defined in claim 6 wherein said valve means includes a first plate member disposed adjacent one axial side of said inner and outer members and adapted to deliver fluid to the pockets from the said one axial side thereof, said first plate member comprising a plurality of axially extending fluid passages corresponding in number to the number of teeth of said inner member, a second plate member disposed adjacent the opposite axial side of said inner and outer members and adapted to direct fluid out of the pockets from the said opposite axial side thereof, said second plate member comprising a plurality of axially extending fluid passages corresponding in number to the number of teeth on said inner member, said first and second plate members being secured against movement relative to inner member, said outer member moving relative to said passages effecting a valving action in cooperation with said first and second plate members.

10. A hydraulic motor as defined in claim 9 wherein said tubular member encircles at least one of said plate members of said valve means.

* * * * *